United States Patent
Nakamura

(10) Patent No.: US 8,977,443 B2
(45) Date of Patent: Mar. 10, 2015

(54) HYBRID CONSTRUCTION MACHINE CONTROL SYSTEM

(75) Inventor: Kazuhito Nakamura, Kobe (JP)

(73) Assignee: Nabtesco Corporation, Tokyo (JP)

(*) Notice: Subject to any disclaimer, the term of this patent is extended or adjusted under 35 U.S.C. 154(b) by 296 days.

(21) Appl. No.: 13/577,338

(22) PCT Filed: Feb. 23, 2011

(86) PCT No.: PCT/JP2011/053949
§ 371 (c)(1), (2), (4) Date: Aug. 6, 2012

(87) PCT Pub. No.: WO2011/105415
PCT Pub. Date: Sep. 1, 2011

(65) Prior Publication Data
US 2012/0303227 A1 Nov. 29, 2012

(30) Foreign Application Priority Data
Feb. 25, 2010 (JP) .................................. 2010-39827

(51) Int. Cl.
| | |
|---|---|
| *G06F 7/70* | (2006.01) |
| *G06F 19/00* | (2011.01) |
| *G06G 7/00* | (2006.01) |
| *G06G 7/76* | (2006.01) |
| *E02F 9/22* | (2006.01) |
| *B60W 10/08* | (2006.01) |
| *E02F 9/12* | (2006.01) |
| *E02F 9/20* | (2006.01) |
| *B60K 6/46* | (2007.10) |
| *B60W 10/30* | (2006.01) |
| *B60W 30/188* | (2012.01) |

(52) U.S. Cl.
CPC .............. *E02F 9/2246* (2013.01); *B60W 10/08* (2013.01); *E02F 9/123* (2013.01); *E02F 9/2075* (2013.01); *E02F 9/2095* (2013.01); *B60K 6/46* (2013.01); *B60W 10/30* (2013.01); *B60W 30/1886* (2013.01); *Y02T 10/6217* (2013.01)
USPC ............................................................ 701/50

(58) Field of Classification Search
USPC ........................................................... 701/50
See application file for complete search history.

(56) References Cited

U.S. PATENT DOCUMENTS

| | | | | |
|---|---|---|---|---|
| 7,849,952 | B2 * | 12/2010 | MacGregor et al. | 180/306 |
| 8,087,240 | B2 * | 1/2012 | Morinaga et al. | 60/414 |

(Continued)

FOREIGN PATENT DOCUMENTS

| | | |
|---|---|---|
| JP | 2007-247230 A | 9/2007 |
| WO | WO2007/052538 A1 | 10/2007 |

OTHER PUBLICATIONS

International Search Report dated Apr. 13, 2011 from corresponding International Application No. PCT/JP2001/053949.

*Primary Examiner* — Nicholas Kiswanto
(74) *Attorney, Agent, or Firm* — Duane Morris LLP

(57) ABSTRACT

[Object] When total power required by a hybrid construction machine increases above output power available from a driving source, power supplied to a rotation motor is restricted. [Means to Realize Object] Driving power from an engine 2 is distributed to a hydraulic pump 6 and a generator 4. Electric power generated by the generator 4 is used to drive a rotation motor 12, and pressurized oil provided by the hydraulic pump 6 is used to drive a hydraulic machine 14. When both of the hydraulic machine 14 and the rotation motor 12 are simultaneously manipulated, the output power outputted by the engine 2 and the required power required by the hydraulic machine 14 and the rotation motor 12 are detected. When the required power exceeds the output power, the torque or acceleration of the rotation motor 12 is restricted to preferentially provide output power to the hydraulic machine 14.

9 Claims, 2 Drawing Sheets

(56) References Cited

U.S. PATENT DOCUMENTS 8,424,302 B2 * 4/2013 Morinaga et al. ............... 60/431
2007/0214782 A1 9/2007 Komiyama et al.
2009/0301075 A1 12/2009 Morinaga et al.
2010/0071973 A1 * 3/2010 Morinaga et al. ........ 180/65.265

* cited by examiner

HYBRID CONSTRUCTION MACHINE CONTROL SYSTEM

TECHNICAL FIELD

This invention relates to a control system for controlling a hybrid construction machine which includes an engine assisted by a generator-motor.

BACKGROUND TECHNOLOGY

An example of a prior technology hybrid construction machine control system is shown in, for example, Patent Literature 1. According to the technology of Patent Literature 1, when a hydraulic cylinder for a boom, which is a hydraulic actuator, and a generator-motor for rotation, which is an electrically driven actuator, are being operated in a complex manner based on the amount of manipulation of a boom manipulating lever and the amount of manipulation of a manipulation lever for rotation, the torque limit of the generator-motor for rotation is decreased as the discharge pressure of the hydraulic pump decreases so as to make the speeds of the two actuators match.

PRIOR ART LITERATURES

Patent Literature

Patent Literature: WO 2007/052538

SUMMARY OF INVENTION

Solution to Problem

According to the technology of Patent Literature 1, it is possible to match the speeds of a hydraulic actuator and an electrically driven actuator. However, if the output power of the engine, when it is exceeded by the total power required by the two actuators, is divided between the hydraulic actuator and the electrically driven actuator in accordance with the amounts of manipulation of the boom manipulating lever and the rotation manipulating lever, the speed of the highly loaded hydraulic actuator significantly decreases, resulting in decrease of operating efficiency.

An object of the present invention is to provide a control system for controlling a hybrid construction machine which can suppress the decrease of operating efficiency of the hybrid construction machine even when the total power required by the construction machine exceeds the output power of a driving source.

Means to Solve the Problem

A hybrid construction machine control system according to one embodiment of the invention is used with a hybrid construction machine which divides the power of an engine serving as part of a driving source between a hydraulic pump and a generator and in which electric power generated by the generator is used to drive a motor for rotation and pressurized oil supplied by the hydraulic pump is used to drive a hydraulic actuator. The rotation motor is used, for example, to rotate an upper rotating member of the hybrid construction machine. The hydraulic actuator is used, for example, to drive a boom provided on the upper rotating member. When the hydraulic actuator and the rotation motor are being operated simultaneously, the control system for the hybrid construction machine detects the output power provided by the driving source and the power required by the hydraulic actuator and the rotation motor, and, if the required power exceeds the output power, restricts the torque or acceleration of the rotation motor and distributes the output power preferentially to the hydraulic actuator. Such preferential distribution may be, for example, such that a larger portion of the output power is distributed to the hydraulic actuator, instead of dividing the output power to the hydraulic actuator and the rotation motor in accordance with the amounts of manipulation of the boom manipulating lever and the rotation manipulating lever. Another example is to divide the output power in proportion to a value of a signal from the rotation manipulating lever multiplied by a factor smaller than unity and to a signal from the boom manipulating lever. Still another example is setting the upper limit of the signal from the rotation manipulating lever and preventing the power larger than the upper limit from being provided for the rotation motor, and a further example is lowering the factor used in controlling the rotation motor, such as a PI constant and a PID constant.

With a hybrid construction machine control system having the above-described structure, even when the hydraulic actuator is in such a highly loaded state to require larger power, the decrease of the operating speed of the hydraulic actuator can be suppressed. In other words, the operating efficiency can be improved even with limited output power from the driving source.

There may be provided engine output detecting means which computes the output power of the engine serving as part of the driving source, from the rotation rate of the output shaft of the engine. The rotation rate of the engine output shaft can be computed from a position sensor of the generator, for example.

Further, there may be provided electricity storage means as the driving source, and also electricity storage output computing means for computing, from the stored voltage on the electricity storage means, the output power from the electricity storage means. The output power from the driving source of the hybrid construction machine is computed by the engine output detecting means and the electricity storage output computing means.

Also, there may be provided generator power detecting means for detecting the power the generator can generate, and also rotation motor drive restricting means for restricting the rotation motor in accordance with the output of the generator power detecting means.

The generator power detecting means may include a flow rate sensor disposed downstream of the hydraulic pump and a pressure sensor for pressurized oil disposed downstream of the hydraulic pump, for computing the power required by the hydraulic actuator. The generator power detecting means may include two shaft torque sensors disposed on the output shaft of the rotation motor, for use in computing the required power of the hydraulic actuator. In another example, the generator power detecting means may compute the required power of the hydraulic actuator from the amount of manipulation of the hydraulic actuator manipulation lever. Alternatively, the generator power detecting means may compute the required power of the hydraulic actuator based on the output of the pressurized oil pressure sensor disposed downstream of the hydraulic pump and the amount of manipulation of the hydraulic actuator manipulation lever. In still another example, the generator power detecting means may compute the required power of the rotation motor and the required power of the hydraulic actuator, based on the amounts of manipulation of the respective manipulation levers.

The range of rotation effected by the rotation motor may be detected, and, when the detected rotation range is equal to or smaller than a predetermined rotation range, the upper limit of the torque or acceleration of the rotation motor may be put. Alternatively, the range of the rotation effected by the rotation motor may be detected, and, when the detected rotation range is equal to or smaller than a predetermined rotation range, the signal from the manipulation lever may be multiplied by a factor smaller than unity.

EMBODIMENTS TO CARRY OUT THE INVENTION

Figure 1:
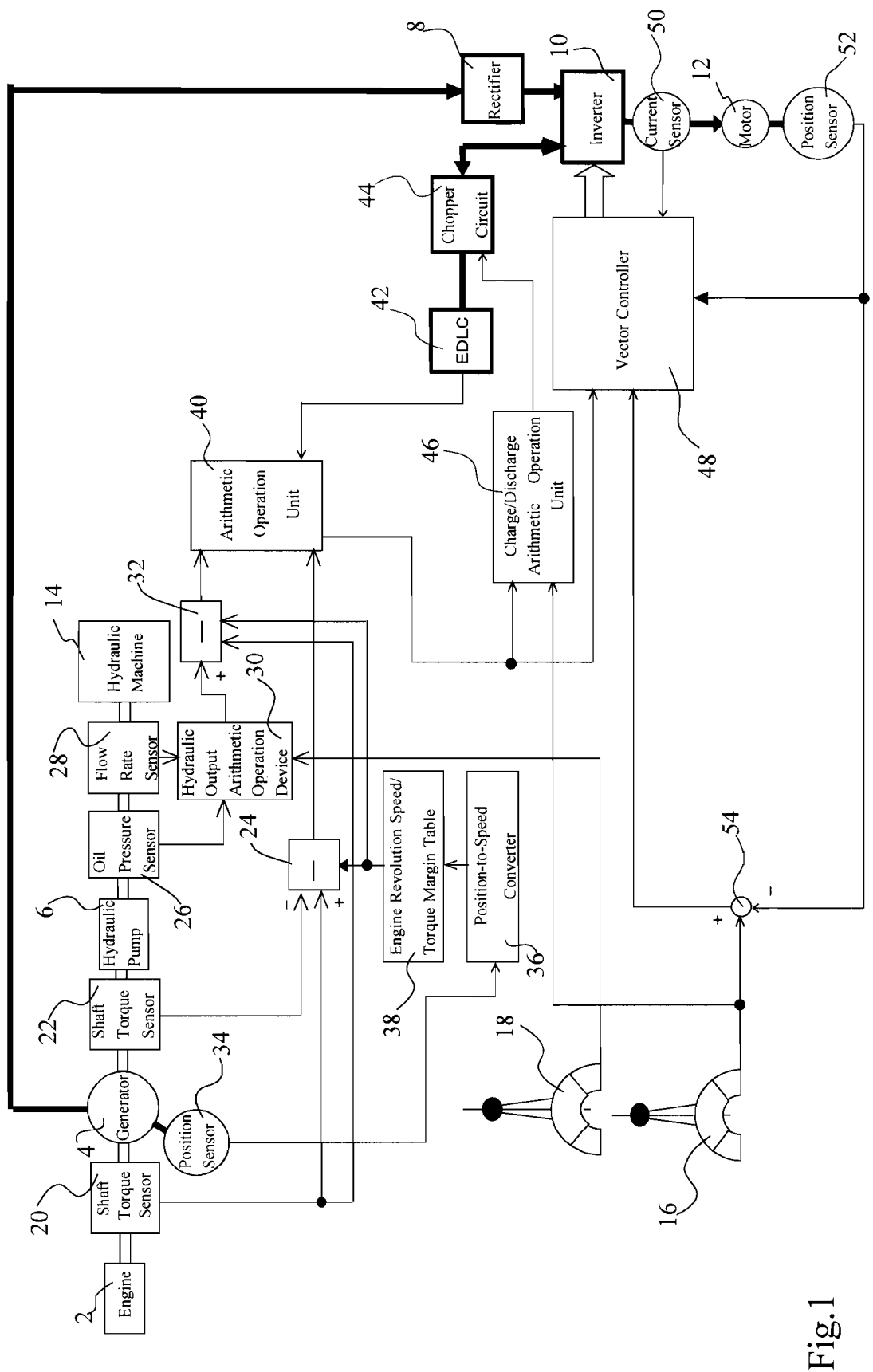
FIG. 1 is a block diagram of a hybrid construction machine control system according to a first embodiment of the present invention.

As shown in FIG. 1, in a hybrid construction machine control system according to a first embodiment of the present invention, a driving source, e.g. an engine 2 drives a generator 4 and a hydraulic pump 6. Specifically, the engine 2 is coupled to an input axis of the generator 4, and the output shaft of the generator 4 is coupled to the hydraulic pump 6.

AC power generated by the generator 4 is converted into DC power in a rectifier 8. The resulting DC power is re-converted into AC power in an inverter 10, which is supplied to a motor 12 for rotation, whereby the rotation motor 12 is driven, resulting in rotation of an upper rotating member of the hybrid construction machine.

The pressurized oil discharged from the hydraulic pump 6 is supplied to a hydraulic machine 14, e.g. a hydraulic cylinder for a boom, so as to drive a boom of a hybrid construction machine.

The rotation motor 12 generates a drive torque in accordance with the amount of manipulation of a rotation manipulating lever 16. The hydraulic pump 6 generates a drive torque in accordance with the amount of manipulation of a hydraulic actuator manipulating lever 18. It may happen that, when both of the two levers 16 and 18 are manipulated simultaneously, the engine 2 cannot provide power required by the hydraulic pump 6 and the rotation motor 12. The present invention is for dealing with such situation.

For this purpose, engine output detecting means, e.g. a shaft torque sensor 20, is provided on the input side of the generator 4, and generator output detecting means, e.g. a shaft torque sensor 22, is provided on the output side of the generator 4. These shaft torque sensors are part of generator power detecting means. The output of the torque sensor 22, or the torque supplied to the hydraulic pump 6 is subtracted from the output of the shaft torque sensor 20, or the input torque to the generator 4 in a subtracter 24, which is the remaining part of the generator power detecting means, whereby output power available from the generator 4 is computed.

An oil pressure sensor 26 and a flow rate sensor 28 forming part of another generator power detecting means are disposed between the hydraulic pump 6 and the hydraulic machine 14, or downstream of the hydraulic pump 6. Outputs of the oil pressure sensor 26 and the flow rate sensor 28 are coupled to a hydraulic output arithmetic operation device 30 which is part of the said another generator power detecting means. A signal from the hydraulic ACT manipulating lever 18 is also applied to the hydraulic output arithmetic operation device 30. The hydraulic output arithmetic operation device 30 computes the output supplied to the hydraulic machine 14. The computed output is subtracted from the output of the shaft torque sensor 20 in a subtracter 32 forming part of the said another generator power detecting means, whereby output power available from the generator 4 is computed.

It should be noted that, although the output of the shaft torque sensor 20 has been described to be used in the subtracters 24 and 32, it may be arranged that output of a position sensor 34 which is provided in association with the generator 4 is converted to a speed (engine revolution speed) in a position-to-speed converter 36, the engine revolution speed is then applied to an engine revolution speed/torque margin table 38, and the output of the engine revolution speed/torque margin table 38 is applied to the subtracters 24 and 32 in place of the output of the shaft torque sensor 20. The engine revolution speed/torque margin table 38 is used to see the characteristic of the engine for computing power available from the generator, when the current shaft torque of the engine is low, but it can be increased by providing more fuel to the engine 2, for the current generator load.

The outputs of the subtracters 24 and 32 are applied to an arithmetic operation unit 40. The arithmetic operation unit 40 also receives a signal representing power from electric power storage means, e.g. an EDLC (electric double-layer capacitor) 42. The EDLC 42 stores therein power available through an inverter 10 and a chopper circuit 44 when, for example, power generated by the engine 2 is more than required for driving the rotation motor 12, or when the rotation motor 12 is subjected to regenerative braking. The EDLC 42 supplies the power stored therein to the rotation motor 12 through the chopper circuit 44 and the inverter 10.

The arithmetic operation unit 40 couples to a charge-discharge arithmetic operation unit 46, a signal outputted from a preselected one of the subtracters 24 and 32 which is representative of the power available from the generator 4, and also couples to a vector controller 48, a signal representative of the sum of the power available from the EDLC 42 and the power available from the generator 4. How to select the subtracters 24 and 32 in the arithmetic operation unit 40 is optional. If necessary, only the torque sensors 20 and 22 and the subtracter 24 may be used, or, alternatively, only the torque sensor 20, the oil pressure sensor 26, the flow rate sensor 28 and the subtracter 32 may be used.

A manipulation signal from a rotation manipulating lever 16 (which represents the power the rotation motor 12 is intended to provide) is also coupled to the charge-discharge arithmetic operation unit 46 and to the vector controller 48. The charge-discharge arithmetic operation unit 46 determines the amount of discharge from the EDLC 42 based on the manipulation signal from the rotation manipulating lever 16 and the signal from the arithmetic operation unit 40 representative of the power available from the generator 4, and informs the chopper circuit 44 of the amount to be discharged from the EDLC 42. For example, when the power available from the EDLC 42 is 6 KW, the power available from the generator 4 represented by the signal from the subtracter 24 or 32 is 2 KW, and the manipulation signal from the rotation manipulating lever 16 indicates the power required is 4 KW, the charge-discharge arithmetic operation unit 46 controls the chopper circuit 44 in such a manner that power of 2 KW, which is the shortage the generator 4 cannot cover, is provided from the EDLC 42 to the inverter 10. The vector controller 48 controls the inverter 10 in such a manner that the power represented by the manipulation signal from the rotation manipulating lever 16 is supplied to the rotation motor 12 when the sum of the power available from the EDLC 42 and the power available from the generator 4 is more than the power represented by the manipulation signal from the rotation manipulating lever 16. To achieve such control, there are provided a current sensor 50 for detecting the current supplied to the rotation motor 12, and a position sensor 52 for detecting the rotational position of the rotation motor 12. The signals from the sensors 50 and 52 are coupled to the vector controller 48. The signal from the position sensor 52 is also coupled to an adder-subtracter 54 for feedback control. The manipulation signal from the rotation manipulating lever 16 is applied to the adder-subtracter 54, and an output of the adder-subtracter 54 is applied to the vector controller 48.

When the power available from the generator 4 as outputted from the arithmetic operation unit 40 is larger than the power represented by the manipulation signal from the rotation manipulation lever 16, the charge-discharge arithmetic operation unit 46 controls the chopper circuit 44 so that the EDLC 42 is charged.

When the power represented by the manipulation signal from the rotation manipulating lever 16 is larger than the sum of the power available from the generator 4 represented by the output of the arithmetic operation unit 40 and the power available from the EDLC 42, or, in other words, when the power required by the hydraulic machine 14 and the rotation motor 12 cannot be obtained from the generator 4 and the EDLC 42, the charge-discharge arithmetic operation unit 46 controls the chopper circuit 44 in such a manner that all the power available from the EDLC 42 is supplied to the inverter 10, and the vector controller 48 commands the inverter 10 to restrict the rotation torque or speed of the rotation motor 12 in order to restrict the power to the rotation motor 12 to the value smaller by the amount of shortage. For example, when the power represented by the manipulation signal from the rotation manipulating lever 16 is 9 KW, the power available from the generator 4 is 2 KW, and the power available from the EDLC 42 is 6 KW, the shortage is 1 KW. Then, the vector controller 48 operates to restrict the rotation torque or speed of the rotation motor 2 so that the power to the rotation motor 12 is decreased by the shortage of 1 KW. In excavation working by the use of a hybrid construction machine, if the rotation speed decreases, resulting in decrease in speed of hydraulic machines (e.g. a boom cylinder and arm cylinder), working efficiency is degraded. A manipulating worker definitely feels the decrease of the efficiency. By the use of the above-described arrangement, priority is given to the hydraulic machines in allocating the output power, whereby the working efficiency can be improved even under the situation of limited output power available from the driving source.

Figure 2:
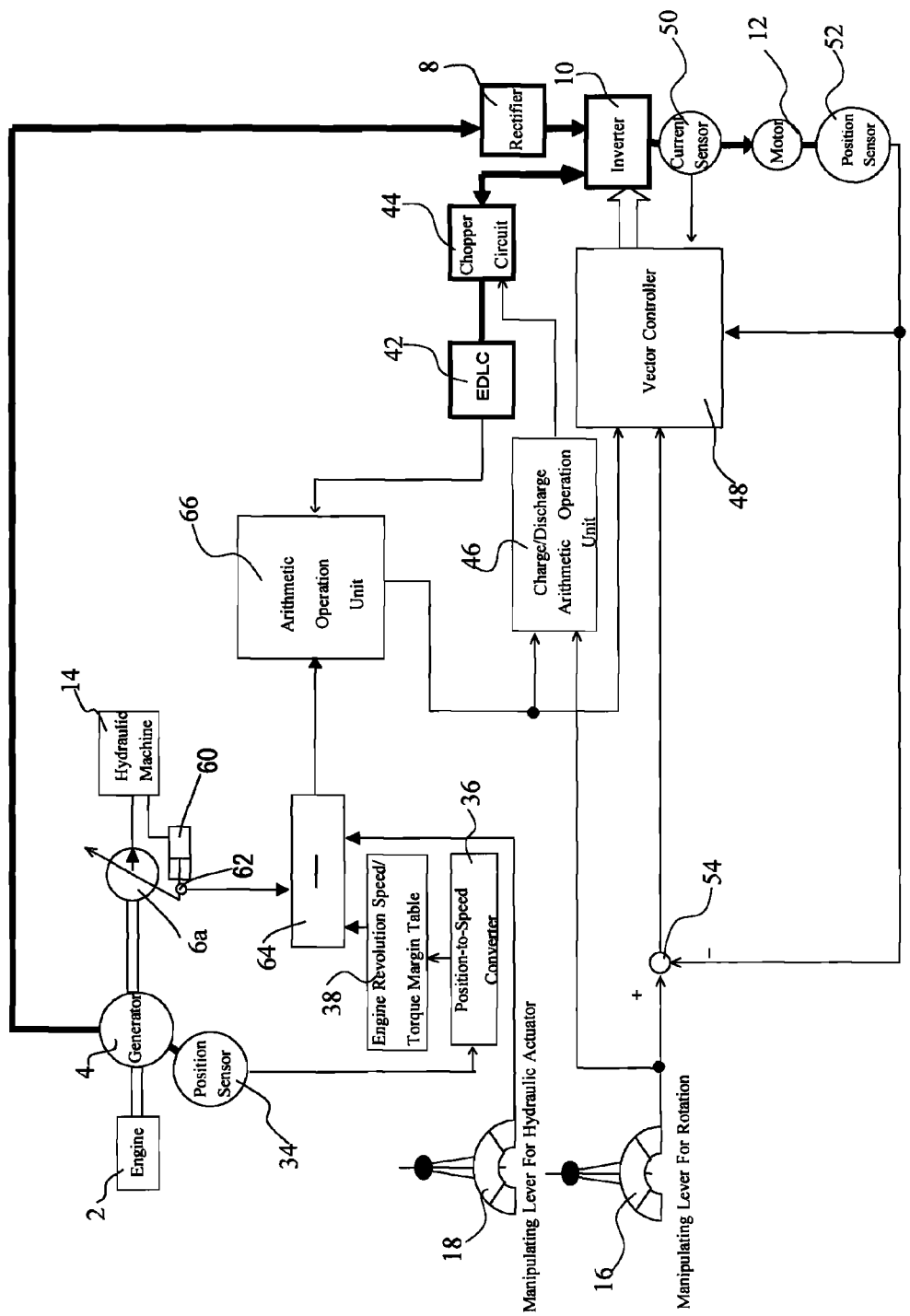
FIG. 2 is a block diagram of a hybrid construction machine control system according to a second embodiment of the present invention.

A second embodiment is shown in FIG. 2. According to the second embodiment, a hydraulic pump 6a which can provide a variable oil pressure is used. The angle of a swash plate of the hydraulic pump 6a is controlled by a regulator 60. A load pressure of the hydraulic machine 14 is supplied to the regulator 60, and the regulator 60 has a drive unit which drives the swash plate of the hydraulic pump 6a to tilt. The drive unit is provided with a position sensor 62. A position signal from the position sensor 62 is applied, as a load signal, to a subtracter 64. The subtracter 64 is also supplied with a manipulation signal from the hydraulic actuator manipulating lever 18 (i.e. a signal representative of power required by the hydraulic actuator) or an output signal from the rotation rate/torque margin table 38, and a signal representative of power available from the generator 4 is supplied from the subtracter 64 to an arithmetic operation unit 66. Also applied to the arithmetic operation unit 66 is a signal representative of power available from the EDLC 42. The operation performed thereafter is the same as in the first embodiment.

In the described two embodiments, when the hydraulic actuator and the electric motor for rotation are simultaneously operated, the output power available from the driving source and the required power demanded by the hydraulic actuator and the rotation motor are detected. If the required power exceeds the output power, the torque or acceleration of the rotation motor is restricted, and the output power is not distributed between the hydraulic actuator and the rotation motor based on the amounts of manipulation of the hydraulic actuator manipulating lever and the rotation motor manipulating lever, but a greater proportion of output power is allocated to the hydraulic actuator. In place of such output power allocation, output allocation may be done in accordance with a signal from the rotation manipulating lever multiplied by a factor smaller than unity and a signal from the hydraulic actuator manipulating lever. As an alternative arrangement, an upper limit may be placed on the signal from the rotation manipulating lever, and, when the upper limited is exceeded, only power below the upper limit is supplied to the rotation motor, or coefficients, such as a PI constant and a PID constant, used in controlling the rotation motor may be lowered. In still another arrangement, the range of rotation effected by the rotation motor may be detected by rotation range detecting means, and judging means is used to judge whether the thus detected rotation range is smaller than a predetermined rotation range. When the detected rotation range is below the predetermined range, the torque or acceleration of the rotation motor may be restricted not to exceed a predetermined upper limit, or the signal from the manipulation lever multiplied by a factor smaller than 1 may be used.

In the above-described embodiments, the EDLC 42 is used, but, instead, a storage battery which can be charged and discharged may be used. If necessary and appropriate, the EDLC 42 may be eliminated.

The invention claimed is:

1. A hybrid construction machine control system for use with a hybrid construction machine, in which driving power of an engine serving as part of a driving source is distributed to a hydraulic pump and a generator, a motor for rotation being driven from power generated by said generator, a hydraulic actuator being driven from pressurized oil supplied by said hydraulic pump, wherein:

said hybrid construction machine control system comprising:

first power detecting means for detecting first power required by said hydraulic actuator;

output power detecting means for detecting at least output power of said engine; and control means to which said first power detected by said first power detecting means, second power required by said rotation motor and said output power detected by said output power detecting means are applied, said control means computing, from said output power and said first power, power which said generator can generate, and, when said second power is larger than the power which said generator can generate, restricting torque or acceleration of said rotation motor so that said output power is distributed preferentially to said hydraulic actuator.

2. A hybrid construction machine control system according to claim 1, wherein said engine output power detecting means computes the output power of said engine from the rotation rate of an output shaft of said engine.

3. A hybrid construction machine control system according to claim 2, wherein there is provided electric power storage means as part of said driving source, said output power detecting means including storage means output power computing means for computing output power of said storage means from a voltage stored in said storage means; power outputted by said driving source being computed from the output power of said engine detected by said engine output detecting means and the output power of said storage means computed by said stored power computing means.

4. A hybrid construction machine control system according to claim 2, wherein the rotation rate of the output shaft of said engine is computed from output of a position sensor of said generator.

5. A hybrid construction machine control system according to claim 1, wherein said first power detecting means computes the first power from an output of a flow rate sensor disposed downstream of said hydraulic pump and an output of a pressure sensor disposed downstream of said hydraulic pump.

6. A hybrid construction machine control system according to claim 1, wherein said first power detecting means is a first torque sensor disposed in the output side of said generator, and said output power detecting means is a second torque sensor disposed in the input side of said generator.

7. A hybrid construction machine control system according to claim 1, wherein said first power detecting means computes said first power in accordance with an amount of manipulation of a manipulating lever for said hydraulic actuator.

8. A hybrid construction machine control system according to claim 1, wherein said first power detecting means computes said first power in accordance with an output of a pressure sensor disposed downstream of said hydraulic pump and an amount of manipulation of a manipulating lever for said hydraulic actuator.

9. A hybrid construction machine control system according to claim 1, wherein said first power detecting means computes said first power from an amount of manipulation of a manipulating lever for said hydraulic actuator, and said control means computes said second power from an amount of manipulation of a manipulating lever for said rotation motor.

* * * * *